United States Patent [19]

Hathaway

[11] Patent Number: 5,587,618

[45] Date of Patent: Dec. 24, 1996

[54] DIRECT CURRENT HOMOPOLAR MACHINE

[76] Inventor: George D. Hathaway, 39 Kendal Avenue, Toronto, Ontario, Canada, M5R 1L5

[21] Appl. No.: 421,317

[22] Filed: Apr. 13, 1995

Related U.S. Application Data

[63] Continuation-in-part of Ser. No. 155,628, Nov. 22, 1993, abandoned.

[30] Foreign Application Priority Data

Apr. 15, 1993 [CA]  Canada ................... 2094078

[51] Int. Cl.$^6$ .................. H02K 49/00; H02K 31/00; H02K 16/00
[52] U.S. Cl. .................. 310/178; 310/102 A; 310/114
[58] Field of Search .................. 310/178, 102 A, 310/114; 322/48

[56] References Cited

U.S. PATENT DOCUMENTS

| | | | |
|---|---|---|---|
| 406,968 | 6/1889 | Tesla | 310/178 UX |
| 1,915,153 | 6/1933 | Chandeysson | 310/178 |
| 2,046,673 | 7/1936 | Chandeysson | 318/253 |
| 3,651,355 | 3/1972 | Mason | 310/112 |
| 4,024,422 | 5/1977 | Gill | 310/178 |
| 4,110,648 | 8/1978 | Stillwagon | 310/178 |
| 5,212,418 | 5/1993 | Mason | 310/114 |
| 5,241,232 | 8/1993 | Reed | 310/178 |

FOREIGN PATENT DOCUMENTS

WO8202126  8/1982  WIPO .

OTHER PUBLICATIONS

Hathaway, G. D., "Experiments with a Unipolar Dynamo of Novel Construction", Abstract for submission to IANS International Symposium on New Energy, submitted for consideration in Mar. 1993.

Valone, T., "The One–Piece Faraday Generator: Theory and Experiment", M.Sc. Thesis, SUNYAB Physics Dept., Buffalo, NY (1983) pp. 1 and 2.

Atkinson, E. Ganot's Physics: Elementary Treatise on Physics Experimental and Applied. Longmans, Green & Co. (1893).

DePalma, B. "The N Machine—Extraction of Electrical Energy Directly from Space", Energy Unlimited, No. 5, Los Lunas (1980).

(List continued on next page.)

*Primary Examiner*—Steven L. Stephan
*Assistant Examiner*—Jonathan Link
*Attorney, Agent, or Firm*—Riches, McKenzie & Herbert

[57] ABSTRACT

This invention relates to a homopolar machine. The homopolar machine can be used as a generator or a motor. In one embodiment, the homopolar machine has a conductive shaft which orbits around two stationary co-linear conductive shafts. There are four electrical connection means, two located on the orbiting shaft and one located on each of the stationary shafts. Each of the two electrical connections on the stationary shafts are connected to an electrical connection on the orbiting shaft. In this way, the three shafts are electrically connected. There is also an armature, which in a preferred embodiment is disc shaped, located at least one of the four electrical connections and comprises at least one of the electrical connections. Furthermore, a magnetic flux path mechanically associated with the orbiting shaft intersects the armature. In operation, the orbiting shaft moves around the two stationary shafts. This motion causes relative rotational movement between the magnetic flux path and the armatures thereby creating an electrical potential across the armatures. Because the armature is located in one of the electrical connection points and comprises an electrical connection, any electrical energy generated by the armature can be removed from the two stationary shafts. Therefore, any electrical energy generated by the machine can be removed without the need for brushes. In a further embodiment, four armatures, each of the four comprising one electrical connection, generate electrical energy in series.

21 Claims, 8 Drawing Sheets

OTHER PUBLICATIONS

DePalma, B. "Studies on Rotation Leading to the N-Machine", First Int'l Symp. on Non-Conventional Energy Technology (1981).

International Textbook Company. I.C.S. Reference Library—Dynamos and Dynamo Design–pp. 24–27 (1905).

Laureti, E. "Hypotheses of Homopolar Atomic Model for Cold Fusion Energy", Nova Astronautica, vol. 12 No. 54 (1992).

Martin, T. The Inventions Researches and Writings of Nikola Tesla, Health Research (1970).

Moon P. et al. "Some Electromagnetic Paradoxes", J. Franklin Inst., 214/260 Nov. (1955).

Tewari, P. "Interaction of Electron and Magnetic Field in Space Power Generation Phenomenon", Magnets in Your Future, L. H. Publishing, California, vol. 2, No. 12 (1987).

Thomas, J. Michael Faraday and the Royal Institution. Adam Hilger, England (1991).

Hooper, W. J. Rotation of Flux about a Magnetic Axis, paper presented at American Physical Society Meeting, St. Louis, Mar. 25–28, 1963.

Depalma, B. Critique of the N–machine constructed by Trombly and Kahn (1985) DePalma Institute.

Wu, Y. H., Kamal, A. A New Homopolar Motor, Franklin Inst. Journal, vol. 258 (1954) pp. 7–20.

Nasar, S. A. E/M Energy Conversion Devices and Systems (1970) Prentice–Hall pp. 124 to 131.

DIRECT CURRENT HOMOPOLAR MACHINE

RELATED APPLICATIONS

This is a continuation-in-part application from U.S. application Ser. No. 08/155,628 filed Nov. 22, 1993 now abandoned.

FIELD OF THE INVENTION

This invention relates to the field of direct current machines and more particularly homopolar direct current machines.

BACKGROUND OF THE INVENTION

Homopolar machines, and in particular generators, differ from other machines in that the armature conductors are arranged with respect to the magnetic flux path such that the armature conductors will always cut across or intersect the magnetic field in the same direction. Thus, in the case of homopolar generators, a direct current may be generated, without the need of commutators.

Figure 1:
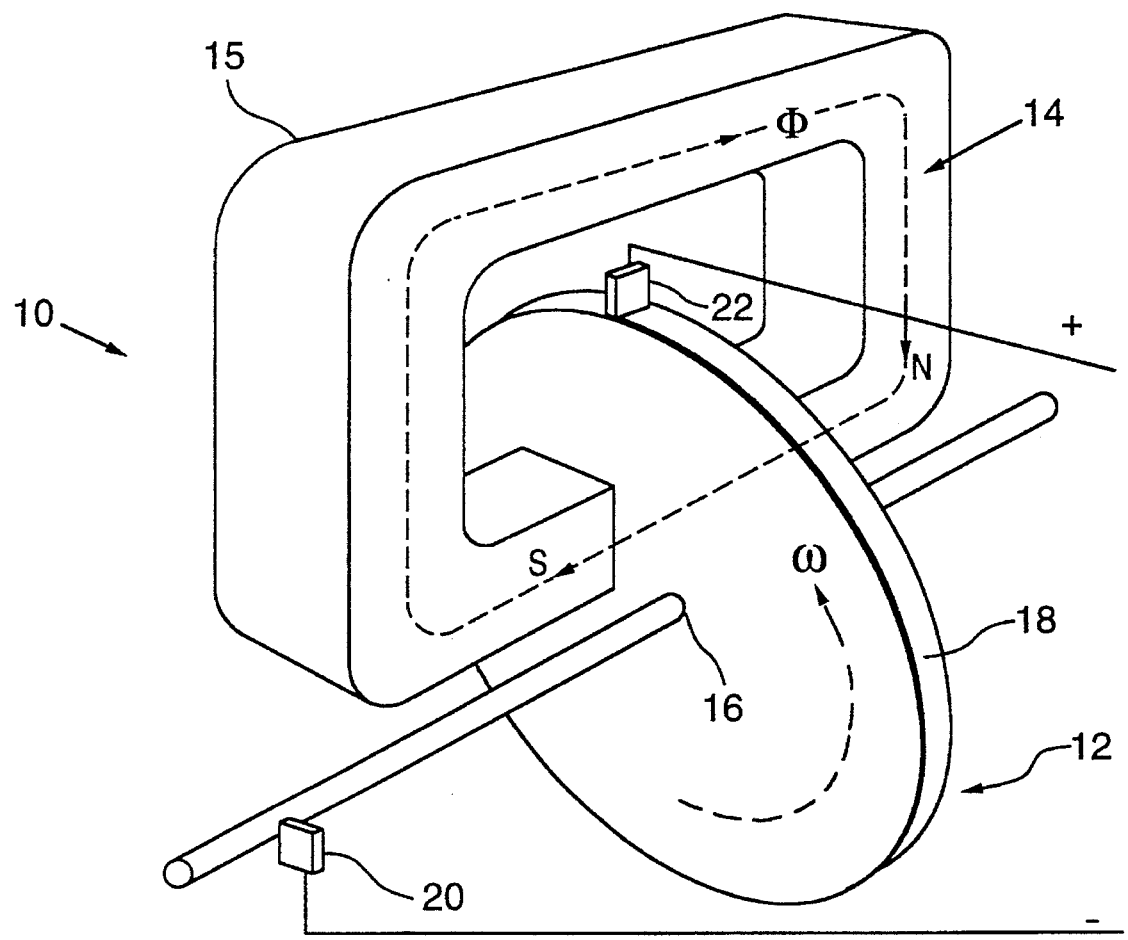
FIG. 1 is a prior art homopolar generator having a disc shaped armature.

A simple prior art homopolar generator 10 is shown in FIG. 1. This generator 10 utilizes a disc 12 rotating on its axis and intersecting the magnetic flux path 14. The magnet 15 forms the magnetic flux path 14 and generates the magnetic flux φ. It is known that the rotation of the disc 12 in this manner generates an electrical potential between radially distinct portions of the disc 12 while there is magnetic flux passing through the magnetic flux path 14. In particular, an electrical potential will be induced between the centre 16 of the disc 12 and the circumference 18 of the disc. In FIG. 1, the electrical energy thus generated is removed by means of brushes 20 and 22.

It is also known that an electrical potential will also be generated in the embodiment shown in FIG. 1 if the disc 12 remains stationary and the magnetic flux path 14, in this case the magnet 15, is rotated around the disc 12, as disclosed by Hooper, W. J. in *Rotation of Flux about a Magnetic Axis*, presented at the American Physical Society Meeting, St. Louis, Mar. 25–28, 1963. Of course, after about one revolution of the magnetic flux path, the magnet 15 will interfere with the brushes 20, 22. Therefore, if the generation is to last longer than one revolution of the magnetic flux path 14 around the disc 12, the brushes 20, 22 would also need to rotate around the disc 12 with the magnetic flux path 14.

The disc 12 in FIG. 1 could be made from copper. Furthermore, the disc 12 could consist of radial conductors in the form of a spoked wheel. Indeed, a copper disc 12 may be thought of as a large number of radial conductors.

Figure 2:
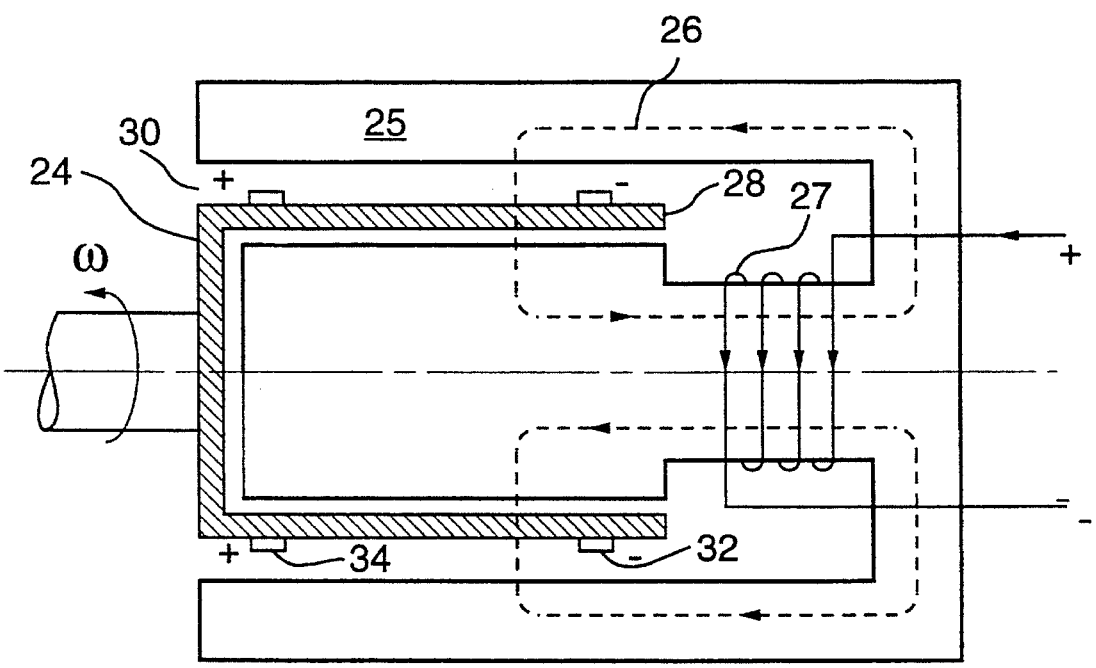
FIG. 2 is a prior art homopolar generator having a drum shaped armature.

In other prior art devices, a conducting drum 24 is used in place of a disc 12, as shown in FIG. 2. The conducting drum 24 rotates on its longitudinal axis and intersects the magnetic flux path 26 thereby generating an electrical potential between axially distinct portions on the drum 24 and in particular between the ends 28, 30. The magnetic flux path 26 is defined by the core 25 which has a low magnetic reluctance. The magnetic flux is generated by the exciting winding 27.

Since the drum 24 is rotating, the electricity is removed by means of brushes 32, 34 located near the ends 28, 30, similar to the case of the disc 12.

One of the disadvantages associated with homopolar machines is that they generally require brushes to remove the electrical energy generated by the armature. This is particularly troublesome since at least one brush must be placed on the outer circumference of a disc 12 or drum 24 and the outer circumference has a high tangential speed.

A further disadvantage is that while homopolar machines can generate electrical energy having a large current, the voltage tends to be small and usually less than 50 Volts. Furthermore, because the electrical energy is in the form of direct current, it cannot be easily transformed to a higher voltage for efficient transmission.

SUMMARY OF THE INVENTION

Accordingly, it is an object of this invention to at least partially overcome the disadvantages of the prior art. Also, it is an object of this invention to provide an alternative type of homopolar generator to provide a larger number of armatures connected in series to provide a larger voltage. Furthermore, it is an object of this invention to provide a homopolar machine which does not require brushes in order to remove the generated electrical energy or supply electrical energy when used as a motor.

In one of its aspects, when used as a generator, the present invention relates to having a stationary armature intersected by a magnetic flux path which rotates with respect to the armature. Also rotating with the magnetic flux path is a conducting shaft which forms part of the electrical circuit that is used to remove electricity generated by the armature without interfering with the rotating magnetic flux path. The conducting shaft can be said to orbit around the stationary armature in that the conducting shaft rotates around the stationary armature at a distance away from the magnetic flux path.

In a further aspect, the present invention relates to an armature connected to a shaft both of which orbit about a stationary shaft. The orbiting shaft and armature are mechanically connected to the stationary shaft such that the orbiting shaft and armature rotate about their axis as they orbit about the stationary shaft. Such mechanical connection means may be accomplished by using bands or gears. A magnetic flux path intersecting the armature orbits with the armature and rotates about the axis of the shaft at a different angular velocity than the armature thereby causing relative movement between the armature and the magnetic flux path. In this way, a current can be induced in the armature and any electrical connection from the armature to the stationary shaft will not interfere with magnetic flux paths.

It is also an aspect of this invention to combine stationary armatures and orbiting armatures in order to provide a more efficient system having a higher total electrical potential.

Accordingly, in one of its aspects, this invention resides in providing a direct current electrical machine comprising an orbiting electrical conductor means comprising a first electrically conductive shaft means extending along an axis and having a first electrical connection means and a second electrical connection means displaced from the first electrical connection means along the axis; a stationary set of electrical conductor means comprising a second electrically conductive shaft means having a third electrical connection means; and a third electrically conductive shaft means having a fourth electrical connection means; a first conductor means electrically coupling the first electrical connection means with the third electrical connection means; a second conductor means electrically coupling the second electrical connection means with the fourth electrical connection means; a first armature means comprising one of the four electrical connection means; a first magnetic flux path mechanically coupled with the orbiting electrical conductor means and intersecting the first armature means; a first magnetic flux generating means for generating a magnetic flux through said first magnetic flux path; wherein the orbiting electrical conductor means is movable around the stationary set of electrical conductor means; wherein movement of the orbiting electrical conductor means around the stationary set of electrical conductor means causes relative movement between said first magnetic flux path and said first armature means; and wherein when the orbiting electrical conductor means moves around the stationary set of electrical conductor means while the first magnetic flux generating means is generating a magnetic flux through the first magnetic flux path an electrical potential is generated between the second electrically conductive shaft means and the third electrically conductive shaft means.

Further aspects of the invention reside in providing a direct current electrical machine comprising an orbiting set of armature means comprising a first armature means; a second armature means; a first shaft means extending along an axis and electrically and mechanically coupled to said first armature means and said second armature means; and wherein said first armature means is axially displaced from said second armature means; a stationary set of armature means comprising a third armature means; a second shaft means electrically and mechanically coupled to said third armature means; a fourth armature means; and a third shaft means electrically and mechanically coupled to said fourth armature means; a first conductor means electrically coupling the first armature means with the third armature means; a second conductor means electrically coupling the second armature means with the fourth armature means; a first magnetic flux path mechanically coupled with the orbiting set of armature means and intersecting at least one of the four armature means; a first magnetic flux generating means for generating a magnetic flux through said first magnetic flux path; wherein the orbiting set of armature means is movable around the stationary set of armature means; wherein movement of the orbiting set of armature means around the stationary set of armature means causes relative movement between said first magnetic flux path and said at least one armature means; and wherein when the orbiting set of armature means moves around the stationary set of armature means while the first magnetic flux generating means is generating a magnetic flux through the first magnetic flux path an electrical potential is generated between the second shaft means and the third shaft means.

Further aspects of the invention will become apparent upon reading the following detailed description and the drawings which illustrate the invention and preferred embodiments of the invention.

It is understood that the present invention is a direct current electrical machine. Therefore, it can be used as a direct current (D.C.) generator or a D.C. motor.

DETAILED DESCRIPTION OF PREFERRED EMBODIMENTS OF THE INVENTION

Figure 3A:
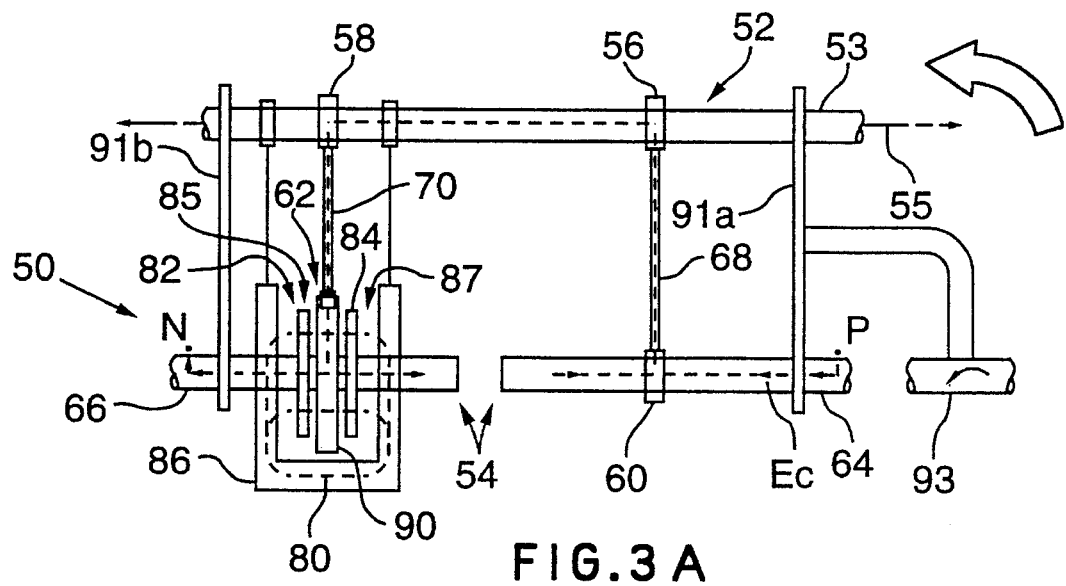
FIGS. 3(a), 3(b), 3(c) show an embodiment of the present invention.
Figure 3B:
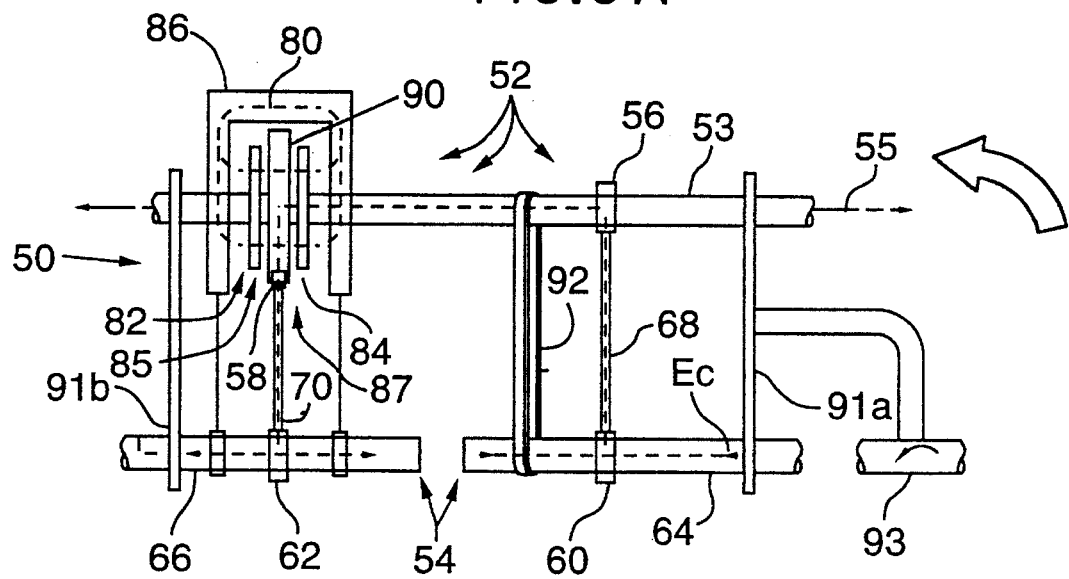
Figure 3C:
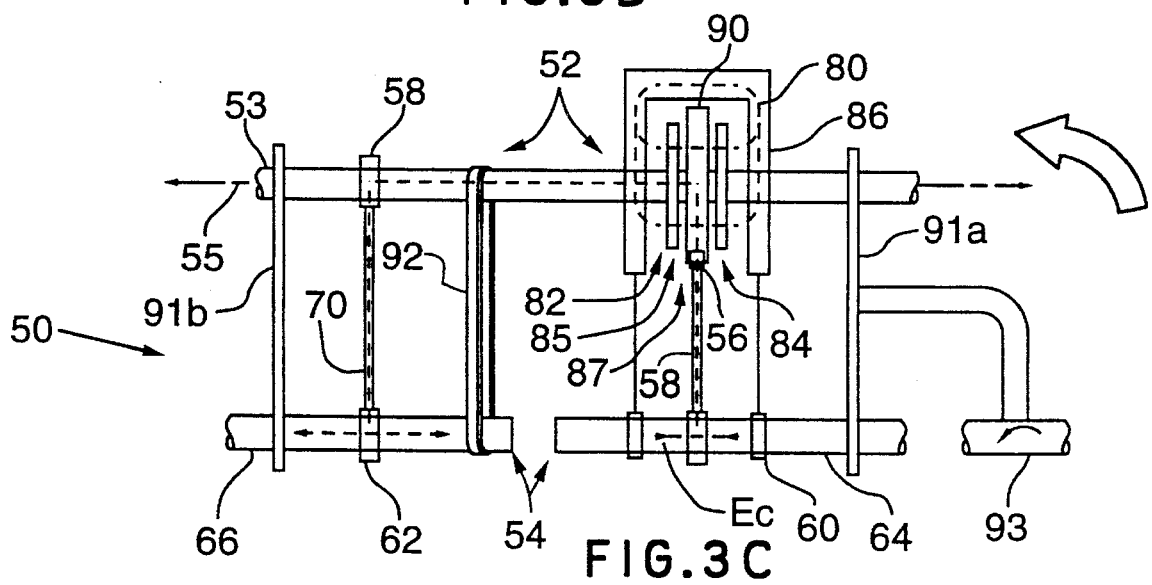

FIGS. 3(a), 3(b) and 3(c) show one embodiment of the present invention. As shown in FIG. 3(a), the direct current (D.C.) electrical machine, shown generally as 50, comprises an orbiting electrical conductor means 52 comprising a first electrically conductive shaft means 53 extending along an axis 55. The first electrically conductive shaft means 53 orbits around a stationary set of electrical conductor means 54. The stationary set of electrical conductor means 54 comprises a second electrically conductive shaft means 64 and a third electrically conductive shaft means 66.

The first electrically conductive shaft means 53 has a first electrical connection means 56 and a second electrical connection means 58. The second electrically conductive shaft means 64 has a third electrical connection means 60. The third electrically conductive shaft means 66 has a fourth electrical connection means 62.

The invention further comprises a first conductor means 68 electrically coupling the first electrical connection means 56 with the third electrical connection means 60. Furthermore, the invention comprises a second conductor means 70 electrically coupling the second electrical connection means 58 with the fourth electrical connection means 62.

The invention also has an armature 90. The armature 90 comprises one of the four electrical connection means 56, 58, 60, 62. In other words, a part of the first armature 90 is used as one of the electrical connection means 56, 58, 60, 62 and another part of the armature 90 is electrically coupled to the corresponding shaft. For example, in FIG. 3(a), the armature 90 comprises the fourth electrical connection means 62 and is electrically and mechanically connected to the third electrically conductive shaft means 66.

In this way, the machine 50 comprises an electric circuit Ec shown in FIG. 3(a) as a dashed line. As shown in FIG. 3(a), the electric circuit Ec comprises the second shaft means 64, the third electrical connection means 60, the first conductor means 68, the first electrical connection means 56, the first electrically conductive shaft means 53, the second electrical connection means 58, the second conductor means 70, the fourth electrical connection means 62, the armature 90 and the third shaft means 66.

It is apparent that the position of the armature 90 in the electric circuit Ec will change depending on which of the four electrical connection means 56, 58, 60, 62 the armature 90 comprises as discussed below and shown in FIGS. 3(a), 3(b) and 3(c).

The invention further comprises a first magnetic flux path 80. The first magnetic flux path 80 is shown in this embodiment substantially contained within a rectangular C shaped yoke 86. The yoke 86 is made from a low reluctance magnetic material and has an air gap 87 within which the armature 90 is located. The magnetic flux passes more easily through the low reluctance magnetic material of the yoke 86 and is thereby substantially contained within the yoke 86. In this way, the yoke 86 forms and contains the first magnetic flux path 80. Furthermore, the yoke 86 concentrates the magnetic flux path 80 through the air gap 87 and the armature 90.

The magnetic flux path 80 is associated with and mechanically coupled to the orbiting electrical conductor means 52 but is free to rotate around the third electrically conductive shaft means 66. In this way, the first magnetic flux path 80 moves with the orbiting electrical conductor means 52. The magnetic flux path 80 will rotate about the third electrically conductive shaft means 66 as the orbiting electrically conductor means 52 (essentially comprising the first electrically conductive shaft means 53) orbits around the stationary set of conductor means 54 (comprising the second electrically conductive shaft means 64 and the third electrically conductive shaft means 66). It is important to note that the first magnetic flux path 80 will not rotate with the first electrically conductive shaft means 53 when the latter rotates on its axis 55. That is, the rotation of the first electrically conductive shaft means 53 about axis 55 is independent of the rotation of the first magnetic flux path 80.

There is also a first magnetic flux generating means 82 for generating a magnetic flux through the first magnetic flux path 80. In FIG. 3(*a*), the first magnetic flux generating means 82 is shown as two magnets 84, 85 which are preferably ring or toroidally shaped.

The first magnetic flux path 80 intersects the armature 90 located in the air gap 87 such that the first magnetic flux path 80 passes through the armature 90. Preferably, the armature 90 is perpendicular to the magnetic flux path 80. It is apparent to persons skilled in the art that the magnetic flux path 80 intersects the armature 90 at a point which forms part of the electric circuit Ec. For example, in FIG. 3(*a*), the magnetic flux path intersects the armature 90 at a point between the electrical connection means 62 which the armature 90 comprises, and the third electrically conductive shaft means 66, to which the armature 90 is electrically coupled.

It is understood that the phrase "electrically coupled" as used herein means that two elements are connected so as to form a good electrical contact as in the electric circuit Ec but not necessarily a fixed mechanical contact. It is also understood that the phrase "mechanically coupled" as used herein means that two elements are connected so as to move together in the same frame of reference, but does not necessarily mean that they are rigidly connected. For example, two elements may be mechanically connected such that they both orbit around a stationary element, but, one of the two orbiting elements could also be rotating about its axis with respect to the other orbiting element such as by the use of bearings.

The invention is structured such that the orbiting electrical conductor means 52 is movable around the stationary set of electrical conductor means 54. In other words, the orbiting electrical conductor means 52 can "orbit" around the stationary set of electrical conductor means 54. The "orbit" can be circular, elliptical or any other closed loop. However, the manufacture of the machine is simplified if the "orbit" is circular. For example, as shown in FIG. 3(*a*), the first electrically conductive shaft means 53 is supported by plates 91*a* and 91*b*, or other rigid mechanical members (not shown), which also guide the first electrically conductive shaft means 53 in a circular orbit around the stationary second and third electrically conductive shaft means 64 and 66 usually by means of rotating bearings. It is apparent that plates 91*a* and 91*b* should not be electrically conductive, or should be insulated from the first, second and third electrically conductive shaft means 53, 64 and 66 so that electric circuit Ec is not short circuited.

The orbital movement of the orbiting electrical conductor means 52 around the stationary set of electrical conductor means 54 is such that it will cause relative movement between the first magnetic flux path 80 and the first armature 90 as discussed above. Accordingly, the movement of the orbiting electrical conductor means 52 around the stationary set of electrical conductor means 54 will generate an electrical potential across the first armature 90 when the first magnetic flux generating means 82 is generating a magnetic flux through the first magnetic flux path 80. Because of electric circuit Ec, the electrical potential generated by armature 90 will appear as a potential between the stationary second electrically conductive shaft 64 and the stationary third electrically conductive shaft 66.

When the machine 50 is operating as a generator, the orbital movement of the orbiting electrical conductor means 52 can be caused by any known means such as an input/output shaft 93 which rotates on its axis thereby rotating plate 91*a*, the first shaft means 53 and plate 91*b* about the stationary set of conductor means 54 (comprising the second and third electrically conductive shafts 64 and 66). Presumably, input/output shaft 93 would be mechanically connected to an external power source such as a water or steam turbine.

When the machine 50 is acting as a motor, an electrical potential applied across the second shaft means 64 and the third shaft means 66 will cause the first shaft means 53 to orbit around the second and third shafts 64 and 66, which are stationary. In this way, machine 50 causes the input/output shaft 93 to rotate on its axis thereby outputting mechanical power when machine 50 is acting as a motor.

It is understood that if the second electrically conductive shaft means 64 and the third electrically conductive shaft means 66 are not electrically coupled, the electric circuit Ec is open as shown in FIG. 3(*a*). However, if the second and third electrically conductive shaft means 64, 66 are electrically coupled one to the other, or, if an electrical load (not shown) is electrically connected to the second electrically conductive shaft means 64 and the third electrically conductive shaft means 66, then the electric circuit Ec will be closed and the machine 50 will generate an electrical potential as well as an associated electrical current through the electric circuit Ec. The electrical potential and current generated in either case would be governed by Ohm's law and would be dependent on the internal resistance of the machine 50, if no load is connected, and the internal resistance plus the resistance of the load, if a load was connected.

Preferably, the second electrically conductive shaft 64 extends past the plate 91A to a point marked as P (and perhaps even past the input/output shaft 93, such as through a hollow shaft) so that an electrical connection can be made to the second shaft 64 without interfering with the orbiting first electrically conductive shaft 53. Likewise, the third electrically conductive shaft 66 should extend past plate 91B to a point N for the same reasons. An electrical connection to points P and N will remove electrical energy from the machine 50 when it is operating as a generator without the need of brushes.

FIG. 3(*a*) shows the armature 90 comprising the fourth electrical connection means 62. In this embodiment, the armature 90 is mechanically and electrically coupled to the third electrically conductive shaft means 66. As stated above, the first magnetic flux path 80 is mechanically coupled with the orbiting electrical conductor means 52 and will move in the frame of reference of the orbiting electrical conductor means 52. Therefore, as the orbiting electrical conductor means 52 moves around the stationary set of electrical conductor means 54, the first magnetic flux path 80 will rotate about the third shaft 66 and move with respect to the first armature 90, which is mechanically coupled to the stationary third electrically conductive shaft means 66. This relative movement between the armature 90 and the first magnetic flux path 80 causes the electrical potential to be generated across the first armature 90.

It is interesting to note that an electrical potential is generated in armature 90 regardless of where the first magnetic flux generating means 82, in this case the ring shaped magnets 84, 85, are in relation to the armature 90. In particular, it has been found that the ring shaped magnets 84, 85 can be attached to the armature 90, or, to the yoke 86, or, to neither such that the disc shaped permanent magnets 84, 85 are only supported by the third electrically conductive shaft means 66. Therefore, it is not relevant whether the armature 90 or the yoke 86 move with respect to the first magnetic flux generating means 82. The only movement which is important is the relative movement between the first magnetic flux path 80 and the armature 90. This is the case regardless of the type of magnetic flux generating means 82 used, namely ring shaped permanent magnets 84, 85 or excitation coils (not shown).

In the embodiment shown in FIG. 3(b), the first armature 90 comprises the second electrical connection means 58 and is mechanically and electrically coupled with the first electrically conductive shaft means 53. As also shown in FIG. 3(b), the first magnetic flux path 80 is mechanically coupled via yoke 86 with the orbiting electrical conductor means 52 such that it moves in the frame of reference of the orbiting electrical conductor means 52.

Furthermore, in this embodiment, movement of the orbiting electrical conductor means 52 around the stationary set of conductor means 54 causes the first electrically conductive shaft means 53 to rotate on its axis 55. One way this could be done is by use of a rotational conversion means 92 mechanically coupled to the first electrically conductive shaft means 53 and the stationary set of electrical conductor means 54. The rotational conversion means 92 causes movement of the orbiting electrical conductor means 52 around the stationary set of electrical conductor means 54 to cause the first electrically conductive shaft means 53 to rotate on its axis 55. The rotational conversion means 92 could simply be a system of gears, or a belt, or band connected to the first electrically conductive shaft means 53 and something in the stationary or laboratory frame of reference. In FIG. 3(b), the rotational conversion means 92 is shown as a non-conductive band around the first shaft means 53 and the second shaft means 64.

Accordingly, in the embodiment shown in FIG. 3(b), the rotational conversion means 92 causes the first shaft means 53 to rotate about its axis 55 which then causes the armature 90 to also rotate about axis 55 because armature 90 is mechanically coupled to the first shaft means 53. An electrical potential is created across armature 90 by the relative movement of the armature 90 and the magnetic flux path 80. The relative movement results from the magnetic flux path 80 orbiting with the orbiting electrical conductor means 52 but not rotating with the first electrically conductive shaft means 53 about its axis 55, because, unlike armature 90, the magnetic flux path 80 is not rigidly mechanically coupled to the first shaft means 53. With respect to the laboratory frame of reference, which is considered stationary, both the magnetic flux path 80 and the armature 90 will be seen as rotating about the axis 55, but the armature 90 will have a different angular velocity than the yoke 86 so that there will be relative movement between the two.

When the embodiment shown in FIG. 3(b) is operating as a generator, the generated electrical energy across armature 90 can be removed by use of electric circuit Ec as discussed above with respect to the embodiment shown in FIG. 3(a). In a similar manner, the embodiment shown in FIG. 3(b) could be used as a motor in the same manner as discussed above with respect to the embodiment in FIG. 3(a).

FIG. 3(c) shows an embodiment of the present invention where the armature 90 comprises the first electrical connection means 56. This embodiment is a mirror image of the embodiment shown in FIG. 3(b) and is mechanically and electrically equivalent to the embodiment shown in FIG. 3(b). Likewise, an embodiment (not shown) wherein the armature 90 comprises the third electrical connection means 60 would be a mirror image, as well as mechanically and electrically equivalent to, the embodiment shown in FIG. 3(a).

It is important to note that regardless of which of the four electrical connection means 56, 58, 60 or 62 the armature 90 comprises, the armature 90 shall be in electrical contact with the second electrically conductive shaft 64 and the third electrically conductive shaft 66, both of which are stationary in the laboratory frame of reference. Therefore, any electrical energy generated by the armature 90 can be extracted from the stationary second shaft 64 and third shaft 66 without the use of brushes. Likewise, if the machine 50 is used as a motor, electrical energy can be supplied without the use of brushes.

Figure 4A:
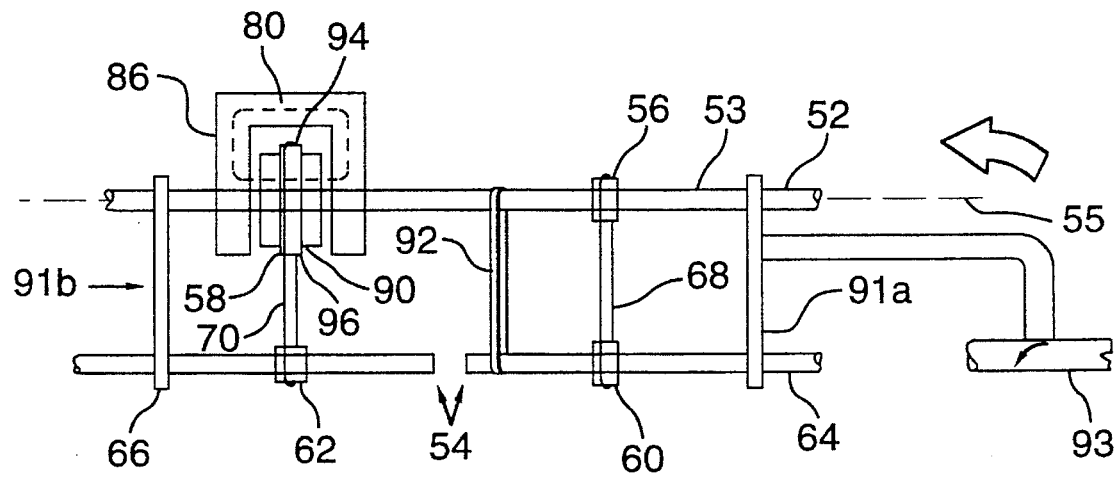
FIGS. 4(a), 4(b), 4(c) show further embodiments of the present invention having differently shaped armatures.

FIG. 4(a) shows the embodiment of the invention where the armature 90 is a disc or ring shaped armature 94. As seen in this embodiment, the second conductor means 70 is a band like electrical conductor wrapped around the circumference of the disc shaped armature 94 and the fourth electrical connection means 62. In this embodiment, the circumference 96 of the disc shaped armature 94 comprises the second electrical connection means 58 on the circumference of the disc shaped armature 94. The second electrical connection means 58 is electrically coupled to the fourth electrical connection means 62 by means of the second conductor means 70.

In a preferred embodiment, as shown in FIG. 4(a), the rotational conversion means 92 is mechanically coupled to the first electrically conductive shaft means 53 and the stationary set of electrical conductor means 54. In one embodiment, the second conductor means 70 comprises the rotational conversion means 92 such that the second conductor means 70 electrically couples the second electrical connection means 58 with the fourth electrical connection means 62 and also causes the movement of the orbiting electrical conductor means 52 around the stationary set of electrical conductor means 54 to rotate the first electrically conductive shaft means 53 on its axis 55.

As in FIGS. 3(a), 3(b) and 3(c), the embodiment in FIG. 4(a) comprises plates 91A and 91B which support the orbiting first electrically conductive shaft means 53 and guides it in its rotation around the stationary set of conductors 54. As also shown in FIGS. 3(a), 3(b) and 3(c), an input/output shaft 93 is mechanically connected to plate 91A to supply mechanical input energy when the machine in FIG.

4(a) is used as a generator, and, to remove mechanical output energy when used as a motor.

Figure 4B:
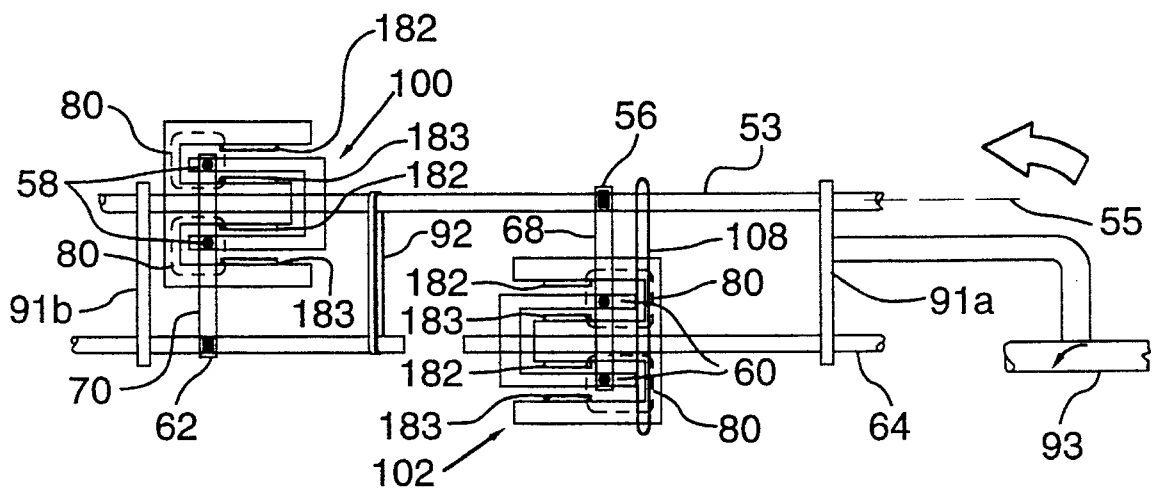

FIG. 4(b) shows an embodiment of the invention with a different shaped armature 90. The embodiment in FIG. 4(b) is substantially the same as the embodiment in FIG. 4(a) except that drum shaped armatures 100, 102, on the first and second shaft means 53, 64, respectively, are used. As shown in FIG. 4(b), the magnetic flux path 80 radially intersects the drum shaped armature 100, 102. The magnetic flux is generated by magnets 182 and 183.

The drum shaped armature 100 on the first shaft means 53 is shown comprising the second electrical connection means 58. In this embodiment, the rotational conversion means 92 causes the first electrically conductive shaft means 53 to rotate on its axis thereby rotating the drum shaped armature 100 on its axis 55. The magnetic flux path 80 is not rigidly fixed to the first electrically conductive shaft means 53, unlike the drum shaped armature 100, and therefore there will be a relative angular rotation between the first shaft means 53 and the drum shaped armature 100. This causes relative movement between the drum shaped armature 100 and the first magnetic flux path 80. The second conductor means 70 electrically couples one end of the drum shaped armature 100, which comprises the second electrical connection means 58, to the fourth electrical connection means 62.

FIG. 4(b) also shows the embodiment of a drum shaped armature 102 which is electrically and mechanically fixed to the second electrically conductive shaft means 64. In this embodiment, the drum shaped armature 102 comprises the third electrical connection means 60. The first conductor means 68 electrically couples the first electrical connection means 56 with the third electrical connection means 60.

Figure 4C:
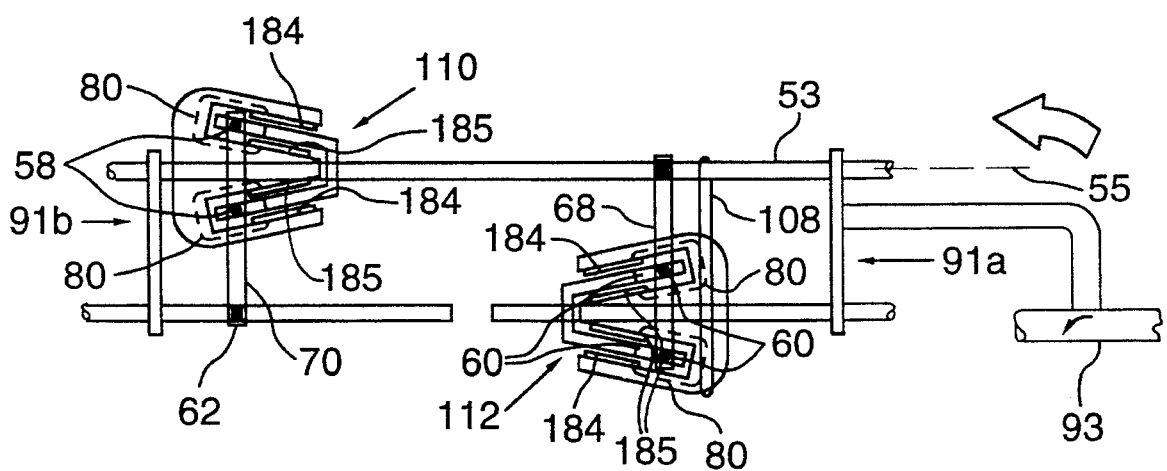

FIG. 4(c) shows an embodiment of the invention where cone shaped armatures 110, 112 are used. The connections for the cone shaped armature are similar to those for the drum shaped armatures 100, 102. The magnetic flux path 80 intersects the cone shaped armatures 110, 112 in a similar manner as with the drum shaped armatures 100, 102 and magnets 184, 185 generate the magnetic flux in the magnetic flux path 80.

In both the drum shaped and cone shaped armatures 100, 102, 110, 112, one part of each of the armatures 100, 102, 110, 112, are mechanically and electrically coupled to the respective shaft means 53, 64, 66. Furthermore, the magnetic flux path 80 intersects the armatures 100, 102, 110, 112 at a location between the second and third electrical connection means 58, 60 and the point where the armature 100, 102, 110, 112 is electrically coupled to the respective shaft means 53, 64, 66.

Furthermore, in the embodiments where the drum shaped or cone shaped armatures 102, 112, are mechanically and electrically coupled to the second electrically conductive shaft means 64, the magnetic flux path 80 rotates around the stationary drum shaped or cone shaped armatures 102, 112, because it is mechanically coupled with the orbiting electrical conductor means 52. Furthermore, mechanical coupling means 108 are shown in both FIGS. 4(b) and 4(c) to mechanically couple the magnetic flux path 80 to the orbiting electrical conductor means 52 so that the magnetic flux path 80 rotates about the second shaft 64 which is stationary. It is noted that the same function could be performed by the first conductor means 68.

Figure 5:
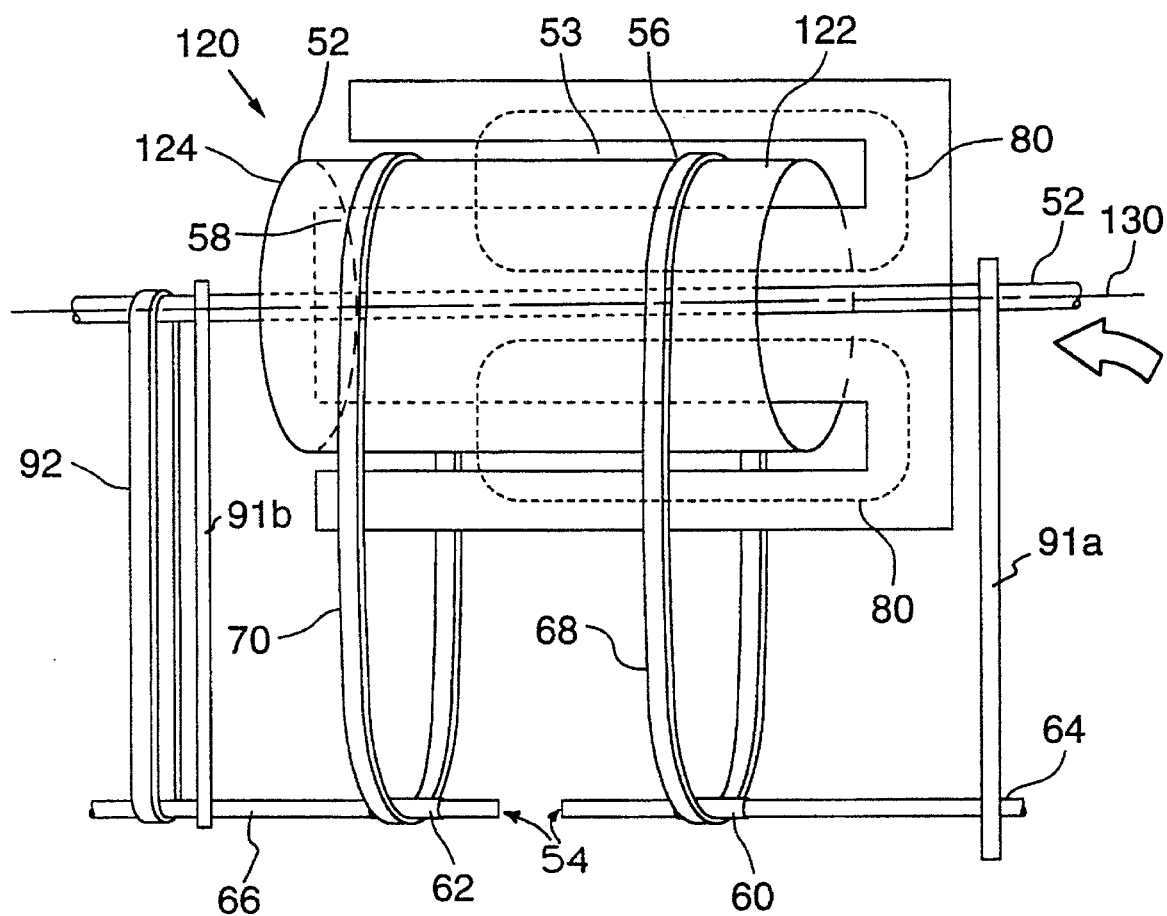
FIG. 5 shows a further embodiment of the present invention.

FIG. 5 shows a further embodiment of the present invention having a cylindrically shaped armature 120. The operation of the embodiment in FIG. 5 is otherwise substantially the same as in the previous embodiments. In this embodiment, the first magnetic flux path 80 radially intersects the cylindrically shaped armature 120 between the first end 122 and the second end 124.

The cylindrically shaped armature 120 is associated with the orbiting electrical conductor means 52 such that the cylindrically shaped armature 120 comprises the first electrically conductive shaft means 53. This is the case because any electrical energy generated by the cylindrically shaped armature 120 shall pass across the surface of the cylindrically shaped armature 120 from a first end 122 to a second end 124. Therefore, the cylindrically shaped armature 120 performs the function of the first electrically conductive shaft means 53. Furthermore, the cylindrically shaped armature 120 comprises the first electrical connection means 56 at the first end 122 of the cylindrically shaped armature 120. Likewise, the second end 124 of the cylindrically shaped armature 120 comprises the second electrical connection means 58.

The cylindrically shaped armature 120 has an axial axis 130 such that, when the cylindrically shaped armature 120 orbits around the stationary set of electrical conductor means 54, the cylindrically shaped armature 120 rotates on its axial axis 130.

As is apparent from the previous discussion, the present invention may comprise four armatures, with each comprising an electrical connection means. Each of the four armatures may have an associated magnetic flux path intersecting each armature such that the four armatures will generate an electrical potential in series when used as a generator. Furthermore, each armature would form a part of the electric circuit Ec through which the generated electrical energy passes.

When four armatures are used the orbiting electrical conductor means 52 will necessarily comprise two armatures 90. Accordingly, in this embodiment, the orbiting electrical conductor means 52 could be referred to as an orbiting set of armature conductors in that two armatures would necessarily be orbiting around two stationary armatures. This is the embodiment illustrated in FIG. 6 which will now be described.

Figure 6:
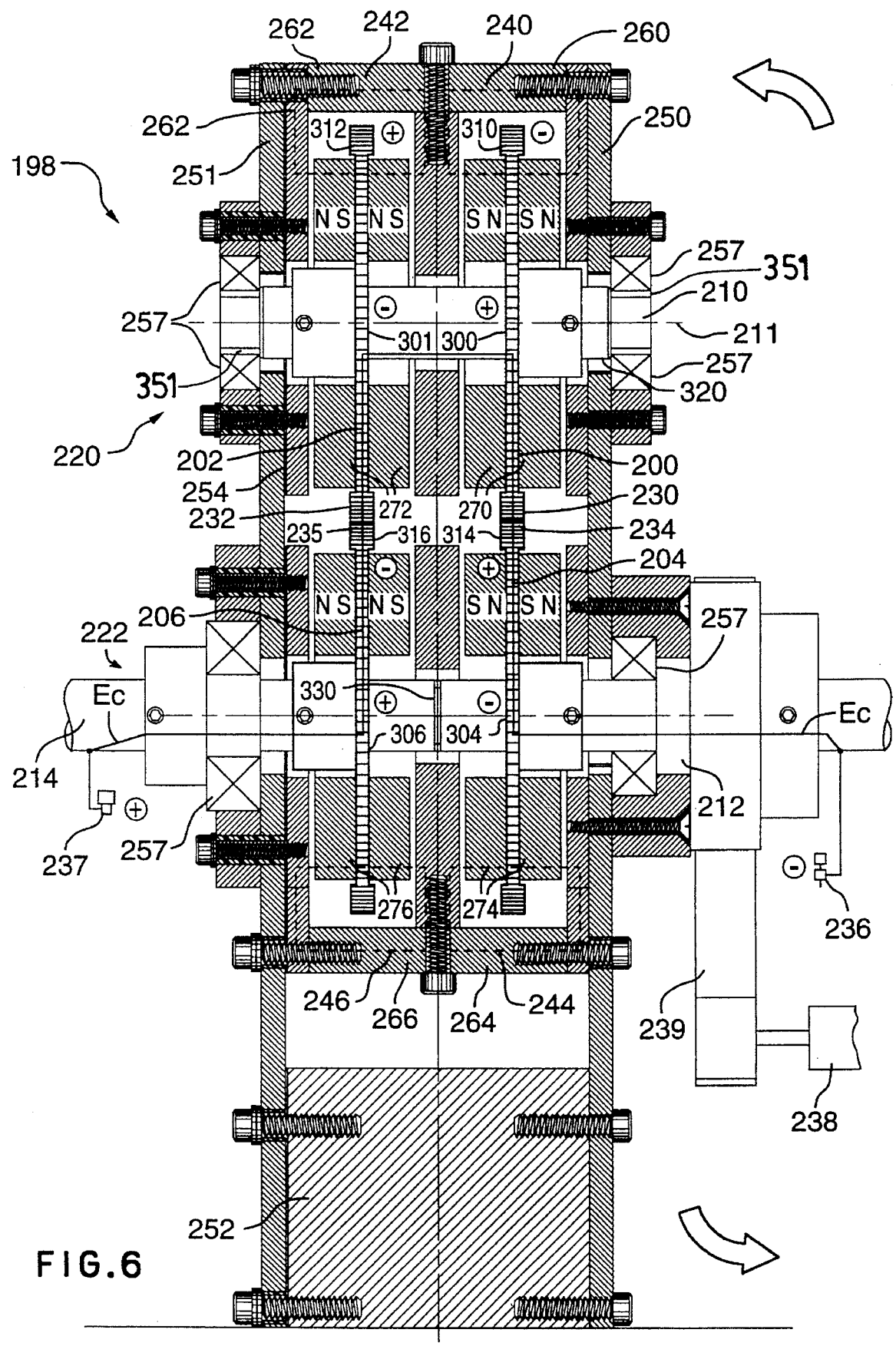
FIG. 6 shows an embodiment of the present invention having four armatures connected in series by means of gears.

FIG. 6 shows an embodiment of the present invention generally used as a generator, shown generally as 198, with four armatures and each of the armatures comprising, or performing the function of the electrical connection means discussed above. The first armature 200 and the second armature 202 are electrically and mechanically coupled to the first shaft means 210. Furthermore, the first shaft means 210 extends along an axis 211, and the first armature 200 is axially displaced along the first shaft means 210 from the second armature 202.

The first shaft means 210, in a preferred embodiment, comprises a solid electrically conductive shaft, which in this embodiment is bronze, to provide a good electrical contact between the first and second armatures 200, 202 and for mechanical support. In addition to bronze, the first shaft means 210 could be made from any other strong electrically conductive material such as berylium copper.

The first and second armatures 200, 202 and the first shaft means 210 form part of the orbiting set of armature means, shown generally in FIG. 6 as 220. The orbiting set of armature means 220 in this embodiment further comprises aluminum side plates 250, 251 to support the first and second armatures 200, 202 and the first shaft means 210. The orbiting set of armature means 220 is intended to include all of the elements which orbit around the stationary set of armature means 222.

Furthermore, in this embodiment, the orbiting set of armature means 220 comprises a counterweight 252. The counterweight 252 balances the machine 198 by balancing the armature means 200, 202, the first shaft means 210 and the first and second magnetic flux paths 240, 242 of the orbiting set of the armature means 220. It is noted that in a further embodiment, the counterweight 252 could be another shaft means (not shown) electrically and mechanically coupled to two more orbiting armature means in the same fashion as the first and second armatures 200, 202 and the first shaft means 210, and then electrically coupled with the third and fourth armatures 204, 206.

The orbiting set of armature means 220 is movable around the stationary set of armature means, shown generally in FIG. 6 as 222. This motion is preferably circular, as discussed above.

The stationary set of armature means 222 comprises a third armature 204, a fourth armature 206, a second shaft means 212 electrically and mechanically coupled to the third armature 204 and a third shaft means 214 electrically and mechanically coupled to the fourth armature 206. The stationary set of armature means 222 refers generally to all of the elements which are stationary in the laboratory frame of reference.

The embodiment shown in FIG. 6 shows the second shaft means 212 electrically separated from the third shaft means 214. This must be done in order to remove electrical energy from the machine 198 by connecting a load (not shown) between the second shaft means 212 and the third shaft means 214 and closing the electric circuit Ec. However, the second shaft means 212 and the third shaft means 214 could also be electrically coupled or connected. In this case, electrical energy could not be removed from the system however, any electrical energy generated by the system would heat the second and third shaft means 212, 214 and could be used to heat other objects such as rooms or fluids passing through the second and third shaft means 212, 214. In this case, any D.C. electrical energy generated by the system could be removed as heat energy rather than electrical energy.

The embodiment shown in FIG. 6 further comprises a first conductor means 230 for electrically coupling the first armature 200 with the third armature 204. Likewise, a second conductor means 232 electrically couples the second armature 202 with the fourth armature 206. The first and second conductor means 230, 232 can consist of any known means to electrically couple the first and second armatures 200, 202 to the third and fourth armatures 204, 206 as discussed above. Such conductor means 230, 232 include a conducting band wrapped around the circumference of the armatures, frictional touching means such as chains or gears, or even moving conductive liquids such as mercury or liquid sodium or a conductive plasma. The embodiment shown in FIG. 6 uses a first and second gear means 234, 235 as the first and second conductor means 230, 232.

The embodiment shown in FIG. 6 shows four magnetic flux paths, 240, 242, 244, 246. Each armature 200, 202, 204, 206 is associated with one magnetic flux path 240, 242, 244, 246 such that the associated magnetic flux path 240, 242, 244, 246 intersects one of the armatures 200, 202, 204, 206. This is a preferred embodiment and it is understood that the invention could operate with only one of the four magnetic flux paths 240, 242, 244, 246 intersecting its corresponding armature 200, 202, 204, 206. However, in order to increase the electrical energy generated by the machine 198, it is preferable that all of the armatures 200, 202, 204, 206 are associated with a magnetic flux path. It is apparent, as discussed above, that the four magnetic flux paths 240, 242, 244, 246 intersect their corresponding armatures 200, 202, 204, 206 at a point forming part of the electric circuit Ec, so that the generated electrical energy can be removed from the machine 198.

Each of the magnetic flux paths 240, 242, 244, 246 is also mechanically coupled with the orbiting set of armature means 220. This means that the magnetic flux paths 240, 242, 244, 246 will move with and be in the frame of reference of the orbiting set of armature means 220. However, the magnetic flux paths 240, 242, 244, 246 should not be electrically or mechanically coupled to any of the shaft means 210, 212, 214.

Furthermore, a magnetic flux generating means 270, 272, 274, 276 is associated with each of the magnetic flux paths 240, 242, 244, 246 to generate a magnetic flux through the associated magnetic flux paths 240, 242, 244, 246. It is apparent that a single large magnetic flux generating means (not shown) could be used to generate magnetic flux through all of the magnetic flux paths 240, 242, 244, 246.

In the embodiment shown in FIG. 6, the magnetic flux generating means 270, 272, 274, 276 are permanent ring or toroidal magnets. However, any known means to generate a magnetic flux may be used such as electrical excitation coils. It is apparent that if excitation coils are used, slip rings may be necessary to obtain excitation current from an external source. Alternatively, it is possible to connect excitation coils to a part of the machine 198 in order to tap enough energy to generate the respective magnetic fluxes. Furthermore, a battery storage means (not shown) could be used to provide excitation current for the excitation coils.

Each of the magnetic flux paths 240, 242, 244, 246 passes through a related yoke 260, 262, 264, 266 which is made from a low reluctance magnetic material and contains the magnetic flux paths 240, 242, 244, 246 respectively, as discussed above.

Accordingly, when the orbiting set of armature means 220 moves around the stationary set of armature means 222, there will be relative movement between each of the magnetic flux paths 240, 242, 244, 246 and its associated armature 200, 202, 204, 206. As discussed above, the invention only needs one magnetic flux path 240, 242, 244, 246 intersecting one armature 200, 202, 204, 206 to operate as an electrical machine. However, it is preferable if all of the armatures 200, 202, 204, 206 have an associated magnetic flux path 240, 242, 244, 246 intersecting them.

It is known that movement of an armature within a magnetic flux path, or movement of a magnetic flux path relative to the armature, will generate an electrical potential across the associated armature 200, 202, 204, 206 if there is magnetic flux passing through the magnetic flux path. Therefore, in the present embodiment, when the orbiting set of armature means 220 moves or orbits around the stationary set of armature means 222 while any one of the magnetic flux generating means 270, 272, 274, 276 generates a magnetic flux through its associated magnetic flux path 240, 242, 244, 246, an electrical potential will be generated across the armatures 200, 202, 204, 206. Because of the electrical connections of the present embodiment as described above, an electrical potential generated across any one of the armatures 200, 202, 204, 206 will appear between the second shaft means 212 and the third shaft means 214. Since the second and third shaft means 212, 214 are stationary, the electrical potential generated by this embodiment of the invention can be removed from the machine 198 without the use of brushes.

FIG. 6 shows two electrical terminals 236, 237 associated with the second shaft means 212 and the third shaft means 214, respectively. Accordingly, the electrical terminals 236, 237 can remove direct current electrical energy from the machine 198 without the use of brushes.

The orbiting set of armature means 220 is rotated around the stationary set of armature means 222 in this embodiment by means of a drive motor 238 and drive belt 239 arrangement. The drive motor 238 and drive belt 239 are used in FIG. 6 to easily control the orbital movement of the orbiting set of armature means 222. It is understood that any known means can be used to rotate the orbiting set of armature means 220 around the stationary set of armature means 222.

As stated above, the third and fourth armatures 204, 206 are mechanically and electrically connected to the second shaft means 212 and the third shaft means 214, respectively. Therefore, the third and fourth armatures 204, 206 do not rotate with respect to the laboratory frame of reference. Accordingly, any electrical potential generated across the third and fourth armatures 204, 206 will be generated from the movement of the associated magnetic flux paths, namely the third magnetic flux path 244 and the fourth magnetic flux path 246, around the third and fourth armatures 204, 206. This relative rotation is accomplished from the fact that the magnetic flux paths 244, 246 are mechanically coupled with the orbiting set of armature means 220 by means of the first yoke 260 and the second yoke 262 being mechanically coupled to side plates 250, 251. Therefore, the third magnetic flux path 244 and the fourth magnetic flux path 246 rotate around the third and fourth armatures 204, 206 which motion generates an electrical potential.

It should be noted that the magnetic flux generating means 270, 272, 274, 276 for each of the magnetic flux paths 240, 242, 244, 246 may be attached to their respective armatures 200, 202, 204, 206 or to the magnetic flux paths 240, 242, 244, 246 which are physically represented by the yokes 260, 262, 264, 266 or to neither. The rotation of the magnetic flux generating means 270, 272, 274, 276 is not relevant for the purposes of generating an electrical potential.

Furthermore, it is preferable that the elements of the machine 198 which conduct the electrical energy generated by the machine 198, such as the first, second and third shaft means 210, 212, 214 and the armatures 200, 202, 204, 206 be electrically insulated from the other elements of the machine 198. This will avoid any electrical energy generated by the machine 198 being dissipated and lost through other parts of the machine 198.

Alternatively, instead of completely isolating the elements which conduct the electrical energy generated by the machine 198, it is possible to electrically insulate part of the elements which do not form part of circuit Ec such that there could not be a closed electric circuit extraneous from the electrical circuit Ec conducting the generated electricity. For example, as shown in FIG. 6, the second and fourth yokes 262, 266 are electrically separated from the side plate 251 by use of plastic insulating sheeting 254 and plastic sleeves on the support screws. Furthermore, first shaft means 210 is electrically insulated from bearings 257 by insulating plastic sleeves 351. However, yokes 260, 262, 264, 266 are not electrically insulated from the side plate 250. In this way, if any of the generated electrical current does come into electrical contact with the side plates 250, 251 or the yokes 260, 262, 264, 266, that electrical current could not form a closed electric circuit and be dissipated as heat through the machine 198.

With respect to the relative movement between the first and second armatures 200, 202 and their associated magnetic flux paths 240, 242, relative movement, or rotation, is accomplished by rotation of the first shaft means 210 on its axis 211. The movement of the orbiting set of armature means 220 around the stationary set of armature means 222 causes the first shaft means 210 to rotate on its axis 211. This rotation can be caused by a rotational conversion means, such as by gear means 234, 235 as shown in FIG. 6. In this embodiment, the gear means 234, 235 cause the first shaft means 210 to rotate on its axis twice each time the orbiting set of armature means 220 rotates around the stationary set of armature means 222 in this gear-coupled embodiment because all of the gears have the same number of teeth, but it is apparent that different rotational rates can be obtained if the ratio of the teeth is changed.

In the embodiment shown in FIG. 6, the gear means 234, 235 which act as the first and second conductor means 230, 232 could also mechanically couple the stationary third and fourth armatures 204, 206 with the orbiting first and second armatures 200, 202. In this way, the first and second gear conductor means 234, 235 shown in FIG. 6 electrically and mechanically couple the armatures 200, 202, 204, 206 and cause the first shaft means 210 to rotate on its axis 211 as the orbiting set of armature means 220 orbits around the stationary set of armature means 222.

It is apparent that while the first and second magnetic flux paths 240, 242 are mechanically coupled with the orbiting set of armature means 220, they are not mechanically coupled with the first shaft means 210 in that the first and second magnetic flux paths 240, 242 do not rotate synchronously with the first shaft means 210 on its axis 211. As shown in FIG. 6, several bearing means 257 are used to mechanically separate the first and second magnetic flux paths 240, 242 and the aluminum supports 250, 251 from the rotating first shaft means 210.

It is emphasized that even though the first shaft means 210 is shown in FIG. 6 to pass through a portion of the yoke 260, 262, the first and second magnetic flux paths 240, 242 are not considered mechanically coupled to the first shaft means 210 because they do not rotate with it on its axis 211. Rather, as discussed above, the first and second magnetic flux paths 240, 242, as well as the third and fourth magnetic flux paths 244, 246 are mechanically coupled with the orbiting set of armature means 220 by being fixed to plates 250 and 251 and rotate with it.

Accordingly, the rotation of the first shaft means 210, as well as the first armature 200 and the second armature 202, each of which are mechanically coupled to the first shaft means 210, around the axis 211 causes relative rotational motion between the first and second armatures 200, 202 and the first and second magnetic flux paths 240, 242 respectively. Therefore, this relative rotational movement generates an electrical potential across the first armature 200 when the first magnetic flux generating means 270 is generating a magnetic flux through the first magnetic flux path 240. Likewise, this motion causes a second electrical potential across the second armature 202 when the second magnetic flux generating means 272 is generating a magnetic flux through the second magnetic flux path 242.

When a magnetic flux is passing through each of the four magnetic flux paths 240, 242, 244, 246 and intersecting its respective armature 200, 202, 204, 206, it is necessary that the polarity of the electrical potential generated across each of the armatures 200, 202, 204, 206 is such that the electrical potential generated by each of the armatures 200, 202, 204, 206 are connected in series. It is known to people skilled in the art that the polarity of the electrical potential generated across an armature is dependent on the direction of rotation of the armature as well as the direction of the magnetic flux passing through the magnetic flux path which intersects the armature means. Accordingly, in order to be additive in series, the polarity of the electrical potential generated by the first armature 200 must be opposite to the polarity of the electrical potential generated by the second armature 202. Likewise, the polarity of the electrical potential generated by the third armature 204 is opposite to the polarity of the electrical potential generated by the first armature 200, and, the polarity of the electrical potential generated across the fourth armature 206 is the same as the polarity of the electrical potential generated across the first armature 200.

To accomplish this, either the rotation of the armatures 200, 202, 204, 206 may be changed or the direction of the magnetic flux passing through the respective magnetic flux paths 240, 242, 244, 246 may be changed.

In the embodiment shown in FIG. 6, the first armature 200 is mechanically coupled to the second armature 202 through the first shaft means 210. Therefore, the first and second armatures 200, 202 will rotate in the same direction. Accordingly, in order to achieve an opposite polarity, the second magnetic flux generating means 272, which in this embodiment are magnets, are arranged to produce a magnetic flux in an opposite direction to the first magnetic flux generating means 270, which also comprises magnets. The direction of the magnetic flux is shown by the North (N) and South (S) symbols on the magnets forming the first and second magnetic flux generating means 270, 272.

Furthermore, FIG. 6 shows the gear means 234, 235 as the first and second conductor means 230, 232. This type of gear arrangement, as shown in FIG. 6, will cause the relative rotational movement between the first and second armatures 200, 202 and the first and second magnetic flux paths 240, 242 to be different from the rotational movement between the third and fourth magnetic flux paths 244, 246 and the third and fourth armature means 204, 206. Therefore, the third magnetic flux generating means 274 must generate a magnetic flux in the same direction as the first magnetic flux generating means 270, and the fourth magnetic flux generating means 276 must generate a magnetic flux in the opposite direction to the first magnetic flux generating means 270. Accordingly, the magnets which form the third and fourth magnetic flux generating means 274, 276 are arranged in such a manner as shown by the North (N) and South (S) symbols.

It is noted that if the relative rotations are different, such as if an idler gear (not shown) is inserted between the teeth of the first and third armatures 200, 204 and the teeth of the second and fourth armatures 202, 206, or if conductive bands are used instead of gears, the relative rotational movement would be different. Accordingly, the direction of the magnetic flux generated by the magnetic flux generating means 270, 272, 274, 276 would need to change in order for the armatures 200, 202, 204, 206 to be in series. This could be done by reversing the magnets on the third and fourth armatures 204, 206.

It is apparent, as was the case above, that the armatures 200, 202, 204, 206 may be disc shaped, cone shaped, drum shaped, or any other shape which can be used as an armature in a homopolar machine.

Furthermore, it is apparent that a cylindrical shaped armature, similar to the cylindrically shaped armature 120 shown in FIG. 5, could be used. In this case, the cylindrically shaped armature, shown in FIG. 5 as 120, would comprise the first armature 200, the first shaft means 210 and the second armature 202. Furthermore, the first magnetic flux path 240 would radially intersect the cylindrically shaped armature 120 as is shown in FIG. 5. The first conductor means and the second conductor means would then be coupled with either ends of the cylindrically shaped armature 120, again as shown in FIG. 5.

In a preferred embodiment, the armatures 200, 202, 204, 206 are disc shaped as shown in FIG. 6. In each case, the disc shaped armatures 200, 202, 204, 206 have a centre 300, 302, 304, 306 and a circumference 310, 312, 314, 316.

It is understood that the centres 300, 302, 304, 306 can be the centre of the disc shaped armatures 200, 202, 204, 206, or, if the shaft means 210, 212, 214 are hollow, the centres 300, 302, 304, 306 would be considered to be the point where the disc shaped armatures 200, 202, 204, 206 meet the respective shaft means 210, 212, 214.

As shown in FIG. 6, the first shaft means 210 comprises a first shaft 320 which extends axially from the centre 300 of the first disc shaped armature 200 to the centre 302 of the second disc shaped armature 202. Furthermore, the second shaft means 212 extends axially from the centre 304 of the third disc shaped armature 204, and the third shaft means 214 extends axially from the centre 306 of the fourth disc shaped armature 206. Furthermore, in this embodiment, the second shaft means 212 and the third shaft means 214 are mechanically coupled but not electrically coupled. In other words, there is a split or gap 330 between the second and third shaft means 212, 214 electrically insulating the second and third shaft means 212, 214. In a preferred embodiment, the split or gap 330 is filled with electrically insulating materials such as plastic or epoxy.

As discussed above, if it is desired to produce electrical energy, or to input an electric current into the machine 198, then the second shaft means 212 and the third shaft means 214 should not be electrically coupled. Accordingly, the split 330 accomplishes this. However, if it is desired to convert the electrical energy generated by the machine 198 into heat energy, then the second and third shaft means 212, 214 could be electrically coupled to short out the machine 198.

In the embodiment shown in FIG. 6, where there is a split 330 between the second and third shaft means 212, 214, any electrical potential generated by the machine shall appear between the second and third shaft means 212, 214.

The second shaft means 212 and the third shaft means 214 can be mechanically coupled without electrically coupling them by having two hollow electrically conductive shafts one for each of the second and third shaft means 212, 214, supported by a common, non-conductive support shaft (not shown) made from a plastic or other non-conductive material. Alternatively, the common support shafts may also be made from electrically conductive material, such as steel, but a common support shaft of this type must be electrically insulated from the second and third shaft means 212, 214 by means an electrically insulating layer such as Delrin (trade mark) plastic. The two hollow electrically conductive shafts could be made from any known electrically conductive material such as beryllium copper or brass.

Furthermore, it is apparent to persons skilled in the art that the machine 198 shown in FIG. 6 could be used as a motor or a generator. While the description of the machine 198 so far has concentrated on its operation as a generator, it is apparent that if an electrical potential, producing an associated current, is applied between the second and third shaft means 212, 214, while the magnetic flux generating means 270, 272, 274, 276 generates a magnetic flux through their associated magnetic flux paths 240, 242, 244, 246, the orbiting set of armature means 220 will move around the stationary set of armature means 222.

Experiments have been conducted with a machine as shown in FIG. 6 and described above. In this experiment four disc shaped armatures were used. The magnetic flux generating means 270, 272, 274, 276 comprise permanent magnets, as shown in FIG. 6, of 3.5 inches in outer diameter and 1.25 inches inner diameter and each pair of magnets generating a flux density of approximately 0.185 Tesla. The drive motor 238 caused the orbiting set of armature means 220 to rotate or orbit around the stationary set of armature means 222 by means of drive belt 239 as shown in FIG. 6. The following direct current open circuit voltages were measured between the two electrical terminals 236 and 237 for the corresponding revolutions per minute (RPM) of the orbiting set of armature means 220 around the stationary set of armature means 222:

| RPM | D.C. VOLTAGE (mV) |
|---|---|
| 50 | 3.2 |
| 100 | 6.2 |
| 125 | 7.6 |
| 150 | 9.1 |
| 175 | 11.0 |
| 200 | 12.3 |

The results exhibit a linear relationship between the RPM and the open circuit voltage as expected by homopolar theory. Also, the open-circuit voltage measured above is exactly four times that expected of a single armature rotating at the above rotations per minute and with comparable magnets.

Figure 7:
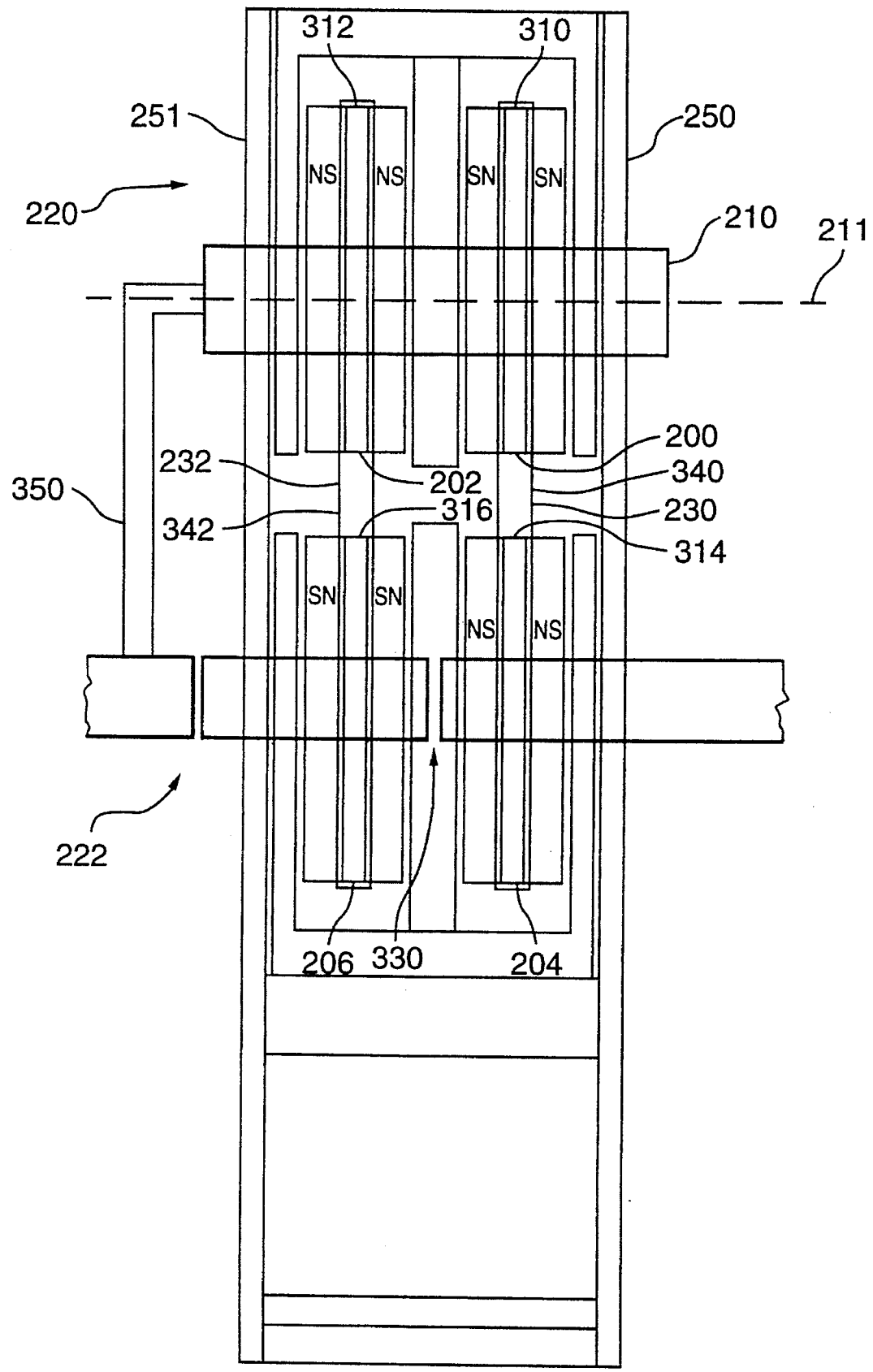
FIG. 7 shows an embodiment of the present invention having electrically conductive bands.

In a further embodiment, as shown in FIG. 7, the first and second electrical conductor means 230, 232 comprise a first and second electrically conductive band 340, 342, respectively. The first electrically conductive band 340 electrically couples the circumference 310 of the first disc shaped armature 200 with the circumference 314 of the third disc shaped armature 204. Likewise, the second electrically conductive band 342 electrically couples the circumference 312 of the second disc shaped armature 202 with the circumference 316 of the fourth disc shaped armature 206.

The first and second electrically conductive bands 340, 342 could also mechanically couple the first and third armatures 200, 204, and the second and fourth armatures 202, 206, respectively. However, it is preferable that the tension on the electrically conductive bands 340, 342 be arranged to maximize electrical conduction while minimizing mechanical stress. Therefore, it is preferred that a rotational conversion means, shown in FIG. 7 generally as 350, be used to cause the movement of the orbiting set of armature means 220 around the stationary set of armature means 222 to cause the first shaft means 210 to rotate on its axis 211. The rotation conversion means 350 could simply be a timing belt.

Figure 8:
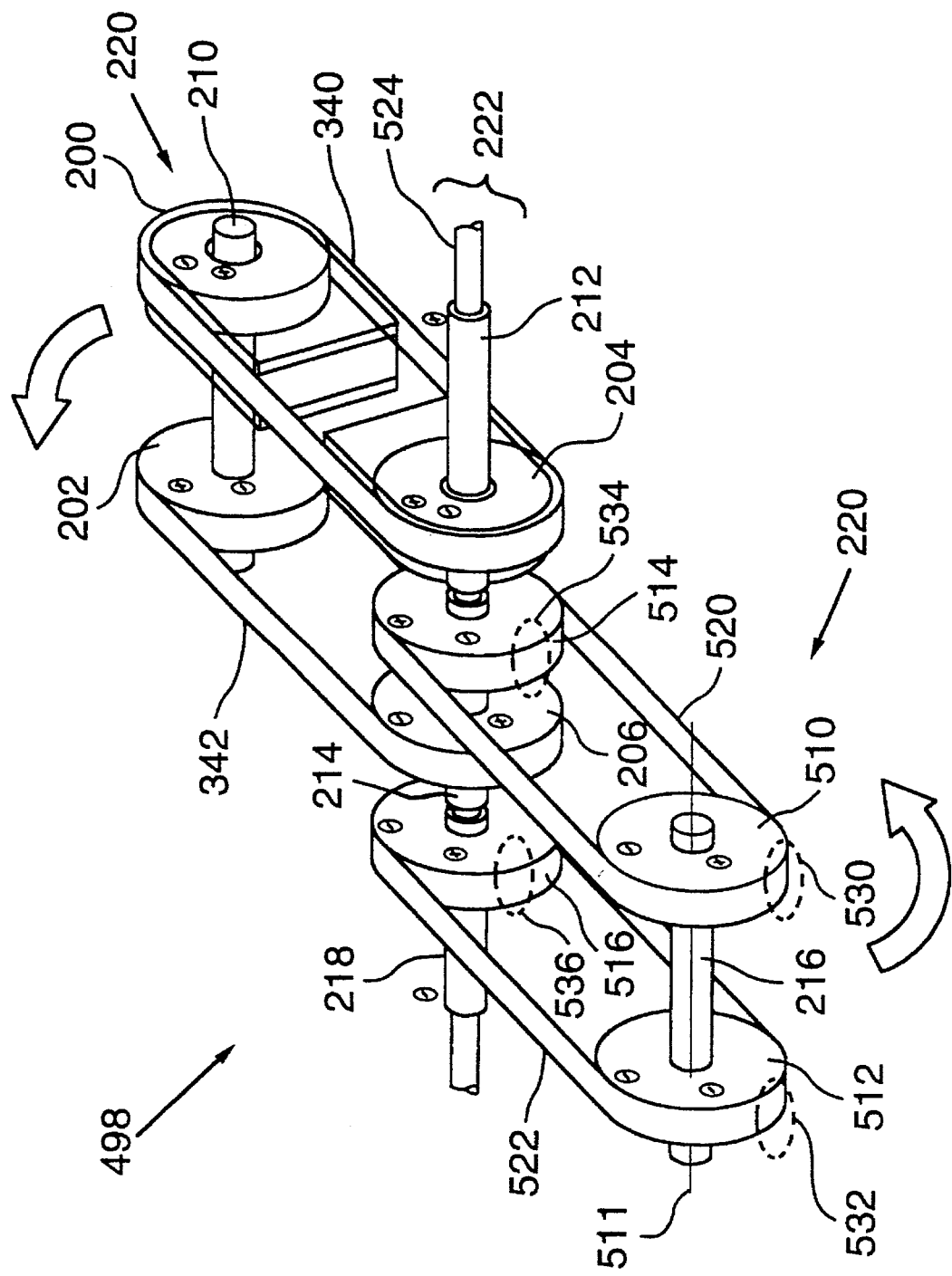
FIG. 8 shows an embodiment of the present invention wherein eight armatures are used.

It is also possible to expand the machine 198 shown in FIG. 6. FIG. 8 shows an embodiment of the present invention wherein the orbiting set of armature means 220 further comprises a fifth disc shaped armature 510 and a sixth disc shaped armature 512. Furthermore, the orbiting set of armature means 220 comprises a fourth shaft means 216 extending along an axis 511 and electrically and mechanically coupled to the fifth and sixth disc shaped armatures 510, 512. The fifth disc shaped armature 510 is axially displaced from the sixth disc shaped armature 512.

Furthermore, as also shown in FIG. 8, the stationary set of armature means 222 in this embodiment further comprises a seventh armature 514 electrically and mechanically coupled to the third shaft means 214 and an eighth armature 516 electrically and mechanically coupled to a fifth shaft means 218. In a preferred embodiment, the second, third and fifth shaft means 212, 214, 218 are all mechanically coupled but not electrically coupled to the same supporting shaft 524 in a manner as described above.

This embodiment of the invention further comprises a third conductor means 520 electrically coupling the fifth and seventh armature 510, 514. Likewise, a fourth conductor means 522 electrically couples the sixth and eighth armatures 512, 516. Each of the fifth, sixth, seventh, and eighth armature means 510, 512, 514, 516 is associated with a magnetic flux path which intersects each respectively, in a manner as described above with respect to the first four armatures 200, 202, 204, 206. Furthermore, each magnetic flux path 530, 532, 534, 536 has an associated magnetic flux generation means for generating a magnetic flux through the magnetic flux paths 530, 532, 534, 536.

As with the first shaft means 210, the fourth shaft means 216 rotates on its axis as the orbiting set of armature means 220 moves around the stationary set of armature means 222. Accordingly, as with the first four armatures 200, 202, 204, 206, the fifth, sixth, seventh, and eighth armatures 510, 512, 514, 516, move relative to their associated magnetic flux paths 530, 532, 534, 536. Furthermore, the magnetic flux generating means for all of the magnetic flux paths are oriented such that the electrical potential generated by each of the armatures 200, 202, 204, 206, 510, 512, 514, 516, is additive in series.

It is apparent that the same arrangement shown in FIG. 8 could be used with additional armatures, such as 12, 16 or more, arranged in tandem.

Figure 9:
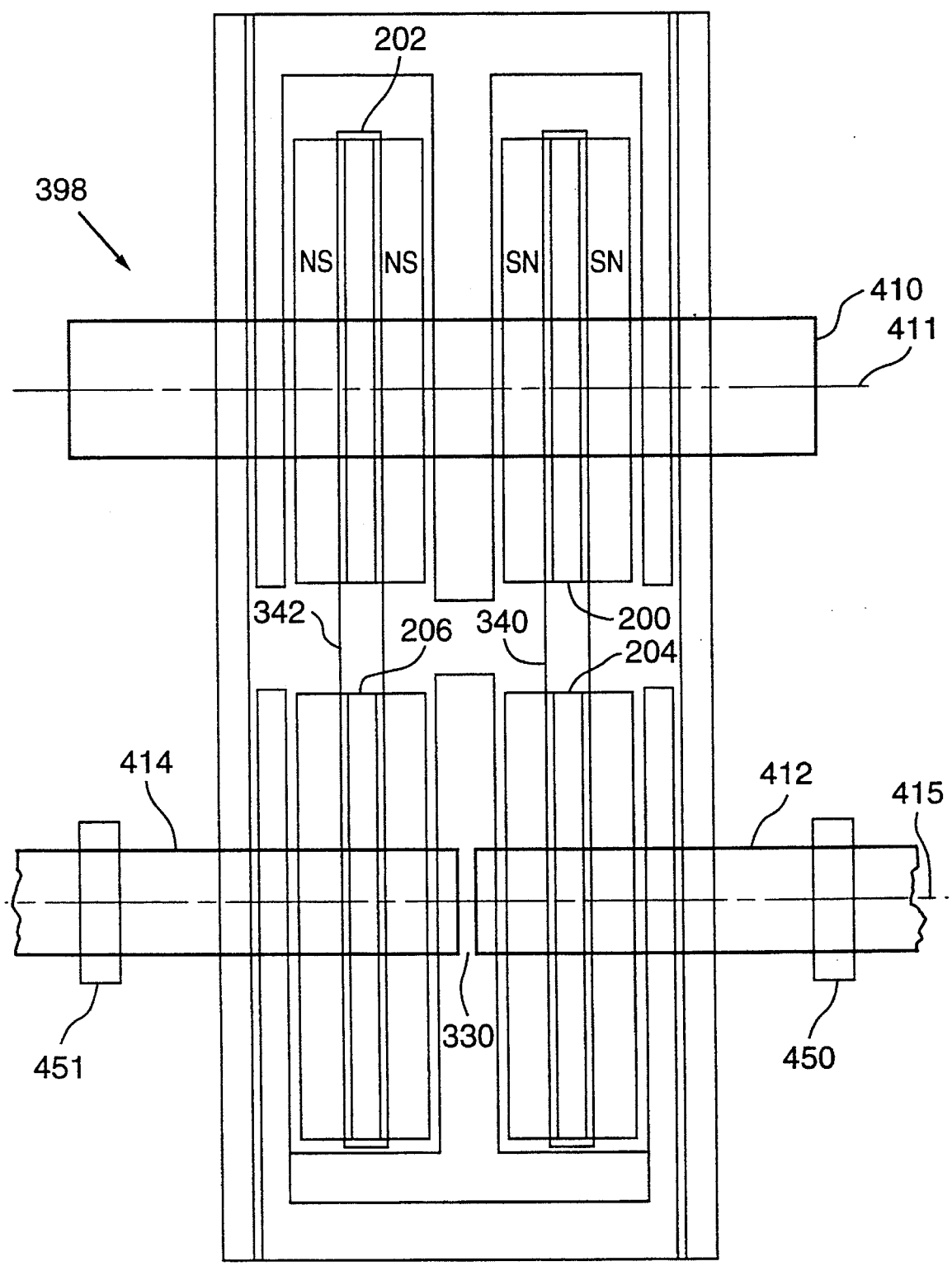
FIG. 9 shows an embodiment of the present invention wherein the shaft means are stationary and brushes are used to remove or supply electrical energy from the machine.

A further embodiment of the present invention, shown in FIG. 9 generally as 398, the four armatures 200, 202, 204, 206, are arranged on three stationary shaft means 410, 412, 414. The arrangement of the armatures in this embodiment is the same as in the other embodiments, and in particular that shown in FIG. 7, except that all three shaft means 410, 412, 414 are stationary. Therefore, this embodiment will generate a larger electrical potential than that of the prior art shown in FIG. 1, due to the fact that four armatures are connected in series. However, brush means, shown as 450, 451 in FIG. 9 are required in order to remove the electrical energy from the machine 398 shown in FIG. 9 because the shaft means 410, 412, 414 are rotating in their respective axes and not around each other. Furthermore, as stated above, the rotating shafts 412, 414 can be electrically coupled to heat gases or fluids.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

The embodiments of the invention in which an exclusive property or privilege is claimed are defined as follows:

1. A direct current electrical machine comprising:
   an orbiting electrical conductor means comprising a first electrically conductive shaft means extending along an axis and having a first electrical connection means and a second electrical connection means displaced from the first electrical connection means along the axis;
   a stationary set of electrical conductor means comprising:
      a second electrically conductive shaft means having a third electrical connection means; and
      a third electrically conductive shaft means having a fourth electrical connection means;
   a first conductor means electrically coupling the first electrical connection means with the third electrical connection means;
   a second conductor means electrically coupling the second electrical connection means with the fourth electrical connection means;
   a first armature means comprising one of the four electrical connection means;
   a first magnetic flux path mechanically coupled with the orbiting electrical conductor means and intersecting the first armature means;
   a first magnetic flux generating means for generating a magnetic flux through said first magnetic flux path;
   wherein the orbiting electrical conductor means is movable around the stationary set of electrical conductor means;
   wherein movement of the orbiting electrical conductor means around the stationary set of electrical conductor means causes relative movement between said first magnetic flux path and said first armature means; and
   wherein when the orbiting electrical conductor means moves around the stationary set of electrical conductor means while the first magnetic flux generating means is generating a magnetic flux through the first magnetic flux path an electrical potential is generated between the second electrically conductive shaft means and the third electrically conductive shaft means.

2. A direct current electrical machine as claimed in claim 1 wherein the first armature means comprises the fourth electrical connection means and is mechanically and electrically coupled to the third electrically conductive shaft means.

3. A direct current electrical machine as claimed in claim 1
   wherein the first armature means comprises the second electrical connection means and is mechanically and electrically coupled to the first electrically conductive shaft means; and
   wherein movement of said orbiting electrical conductor means around the stationary set of electrical conductor means causes the first electrically conductive shaft means to rotate on its axis with respect to the first magnetic flux path.

4. A direct current electrical machine as claimed in claim 3 wherein the armature means is disc shaped having a centre and a circumference and wherein the circumference of the disc comprises the electrical connection means and the centre of the disc is mechanically and electrically coupled to an electrically conductive shaft means.

5. A direct current electrical machine as claimed in claim 3 wherein the armature means is drum shaped.

6. A direct current electrical machine as claimed in claim 3 wherein the armature means is cone shaped.

7. A direct current electrical machine as claimed in claim 1
   wherein the armature means is cylindrically shaped and has an axial axis and is associated with the orbiting electrical conductor means such that the cylindrically shaped armature means comprises the first electrically conductive shaft means;
   wherein a first end of the cylindrically shaped armature means comprises the first electrical connection means and a second end of the cylindrically shaped armature means comprises the second electrical connection means;
   wherein the first magnetic flux path radially intersects the cylindrically shaped armature means between the first end and the second end; and
   wherein as the cylindrically shaped armature means orbits around the stationary set of electrical conductor means the cylindrically shaped armature means rotates on its axial axis with respect to the first magnetic flux path.

8. A direct current electrical machine comprising:
   an orbiting set of armature means comprising:
      a first armature means;
      a second armature means;
      a first shaft means extending along an axis and electrically and mechanically coupled to said first armature means and said second armature means; and
   wherein said first armature means is axially displaced from said second armature means;
   a stationary set of armature means comprising:
      a third armature means;
      a second shaft means electrically and mechanically coupled to said third armature means;
      a fourth armature means; and
      a third shaft means electrically and mechanically coupled to said fourth armature means;
   a first conductor means electrically coupling the first armature means with the third armature means;
   a second conductor means electrically coupling the second armature means with the fourth armature means;
   a first magnetic flux path mechanically coupled with the orbiting set of armature means and intersecting at least one of the four armature means;
   a first magnetic flux generating means for generating a magnetic flux through said first magnetic flux path;
   wherein the orbiting set of armature means is movable around the stationary set of armature means;
   wherein movement of the orbiting set of armature means around the stationary set of armature means causes relative movement between said first magnetic flux path and said at least one armature means; and
   wherein when the orbiting set of armature means moves around the stationary set of armature means while the first magnetic flux generating means is generating a magnetic flux through the first magnetic flux path, an electrical potential is generated between the second shaft means and the third shaft means.

9. A direct current electrical machine as claimed in claim 8
   wherein said at least one of the four armature means is the third armature means; and
   wherein the first magnetic flux path is mechanically coupled with the orbiting set of armature means such that when the orbiting set of armature means moves around the stationary set of armature means the first magnetic flux path rotates with respect to the third armature means.

10. A direct current electrical machine as claimed in claim 8 wherein said at least one of the four armature means is the first armature means;

wherein movement of the orbiting set of armature means around the stationary set of armature means causes the first shaft means to rotate on its axis with respect to the first magnetic flux path;

wherein the first magnetic flux path is mechanically coupled with the orbiting set of armature means but not the first shaft means such that when the orbiting set of armature means moves around the stationary set of armature means the first armature means rotates with respect to the first magnetic flux path; and wherein when the orbiting set of armature means moves around the stationary set of armature means while the first magnetic flux generating means is generating a magnetic flux through the first magnetic flux path, a first electrical potential having a first polarity is generated across the first armature means.

11. A direct current electrical machine as claimed in claim 10 further comprising:

a second magnetic flux path intersecting the second armature means;

a second magnetic flux generating means for generating a magnetic flux through the second magnetic flux path;

wherein the second magnetic flux path is mechanically coupled with the orbiting set of armature means but not the first shaft means such that when the orbiting set of armature means moves around the stationary set of armature means the second armature means rotates with respect to the second magnetic flux path;

wherein when the orbiting set of armature means moves around the stationary set of armature means while the second magnetic flux generating means is generating a magnetic flux through the second magnetic flux path, a second electrical potential having a second polarity is generated across the second armature means; and wherein the second polarity is opposite to the first polarity.

12. A direct current electrical machine as claimed in claim 11 further comprising:

a third magnetic flux path intersecting the third armature means;

a third magnetic flux generating means for generating a magnetic flux through the third magnetic flux path;

wherein the third magnetic flux path is mechanically coupled with the orbiting set of armature means such that when the orbiting set of armature means moves around the stationary set of armature means the third magnetic flux path rotates with respect to the third armature means; and wherein when the orbiting set of armature means moves around the stationary set of armature means while the third magnetic flux generating means is generating a magnetic flux through the third magnetic flux path, a third electrical potential having a third polarity is generated across the third armature means; and wherein the third polarity is opposite to the first polarity.

13. A direct current electrical machine as claimed in claim 12 further comprising:

a fourth magnetic flux path intersecting the fourth armature means;

a fourth magnetic flux generating means for generating a magnetic flux through the fourth magnetic flux path;

wherein the fourth magnetic flux path is mechanically coupled with the orbiting set of armature means such that when the orbiting set of armature means moves around the stationary set of armature means the fourth magnetic flux path rotates with respect to the fourth armature means; and wherein when the orbiting set of armature means moves around the stationary set of armature means while the fourth magnetic flux generating means is generating a magnetic flux through the fourth magnetic flux path, a fourth electrical potential having a fourth polarity is generated across the fourth armature means;

wherein the fourth polarity is the same as the first polarity; and wherein the four armature means are electrically connected in series.

14. A direct current electrical machine as claimed in claim 13 wherein the four armature means are drum shaped.

15. A direct current electrical machine as claimed in claim 10 further comprising a cylindrically shaped armature means comprising the first armature means, the first shaft means and the second armature means such that the first magnetic flux path radially intersects the cylindrically shaped armature means and the first conductor means is electrically coupled with a first end of the cylindrically shaped armature means and the second conductor means is electrically coupled with a second end of the cylindrically shaped armature means.

16. A direct current electrical machine as claimed in claim 13 wherein the first armature means is disc shaped and has a centre and a circumference;

the second armature means is disc shaped and has a centre and a circumference;

the third armature means is disc shaped and has a centre and a circumference; and the fourth armature means is disc shaped and has a centre and a circumference.

17. A direct current electrical machine as claimed in claim 16 wherein the first shaft means comprises a first shaft extending axially from the centre of the first disc shaped armature means to the centre of the second disc shaped armature means;

the second shaft means extends axially from the centre of the third disc shaped armature means;

the third shaft means extends axially from the centre of the fourth disc shaped armature means; and the second shaft means and the third shaft means are mechanically coupled, but not electrically coupled.

18. A direct current electrical machine as claimed in claim 17 wherein the first electrical conductor means comprises a first electrically conductive band electrically coupled with the circumference of the first disc shaped armature means and the circumference of the third disc shaped armature means; and the second electrical conductor means comprises a second electrically conductive band electrically coupled with the circumference of the second disc shaped armature means and the circumference of the fourth disc shaped armature means.

19. A direct current electrical machine as claimed in claim 17 wherein the first electrical conductor means comprises a first gear means for mechanically and electrically coupling the first disc shaped armature means and the third disc shaped armature means; and the second electrical conductor means comprises a second gear means for mechanically and electrically coupling the second disc shaped armature means and the fourth disc shaped armature means.

20. A direct current electrical machine as claimed in claim 17 wherein the orbiting set of armature means further comprises:
- a fifth disc shaped armature means;
- a sixth disc shaped armature means;
- a fourth shaft means extending along an axis and electrically and mechanically coupled to said fifth and sixth disc shaped armature means; and
- wherein said fifth armature means is axially displaced from said sixth armature means;

wherein the stationary set of armature means further comprises:

a seventh armature means electrically and mechanically coupled to said third shaft means;
an eighth armature means; and
a fifth shaft means electrically and mechanically coupled to said eighth armature means;

wherein said machine further comprises:
- a third conductor means electrically coupling the fifth armature means with the seventh armature means;
- a fourth conductor means electrically coupling the sixth armature means with the eighth armature means;
- a fifth magnetic flux path mechanically coupled with the orbiting set of armature means and intersecting the fifth armature means;
- a fifth magnetic flux generating means for generating a magnetic flux through said fifth magnetic flux path;
- a sixth magnetic flux path mechanically coupled with the orbiting set of armature means and intersecting the sixth armature means;
- a sixth magnetic flux generating means for generating a magnetic flux through said sixth magnetic flux path;
- a seventh magnetic flux path mechanically coupled with the orbiting set of armature means and intersecting the seventh armature means;
- a seventh magnetic flux generating means for generating a magnetic flux through said seventh magnetic flux path;
- an eighth magnetic flux path mechanically coupled with the orbiting set of armature means and intersecting the eighth armature means; and
- an eighth magnetic flux generating means for generating a magnetic flux through said eighth magnetic flux path;

wherein the second, third and fifth shaft means are not electrically coupled to each other;

wherein movement of the orbiting set of armature means around the stationary set of armature means causes the fourth shaft means to rotate on its axis;

wherein all magnetic flux generating means generate a magnetic flux in their associated magnetic flux paths such that all of the armature means generate an electrical potential in series.

21. A direct current electrical machine as claimed in claim 9 wherein when an electrical potential is applied between the second shaft means and the third shaft means while the first magnetic flux generating means is generating a magnetic flux through the first magnetic flux path the orbiting set of armature means moves around the stationary set of armature means.

* * * * *